(No Model.)
F. I. HITCHCOCK.
WEIGHING SCALE.
No. 285,815. Patented Oct. 2, 1883.
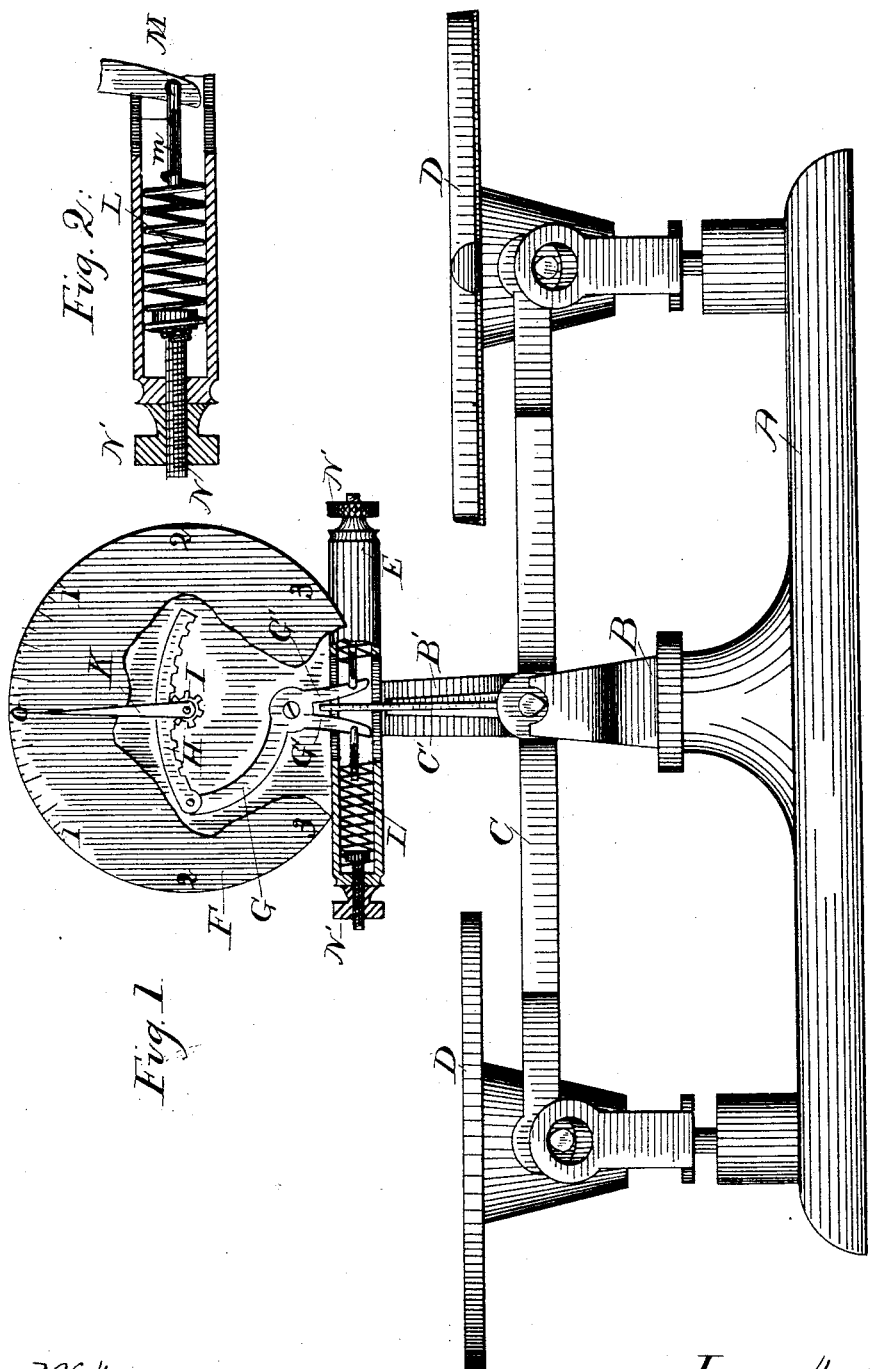
Witnesses
S. S. Williamson
A. M. Wooster
Inventor
Frank I. Hitchcock
By Wooster & Smith
Attys.

UNITED STATES PATENT OFFICE.

FRANK I. HITCHCOCK, OF BRIDGEPORT, CONNECTICUT.

WEIGHING-SCALE.

SPECIFICATION forming part of Letters Patent No. 285,815, dated October 2, 1883.

Application filed August 4, 1883. (No model.)

*To all whom it may concern:*

Be it known that I, FRANK I. HITCHCOCK, a citizen of the United States, residing at Bridgeport, in the county of Fairfield and State of Connecticut, have invented certain new and useful Improvements in Scales; and I do hereby declare the following to be a full, clear, and exact description of the invention, such as will enable others skilled in the art to which it appertains to make and use the same.

My invention relates to scales, and has for its object to produce a combined spring and balance scale which, in addition to weighing minute subdivisions with absolute accuracy, shall also indicate correctly the difference in weight between the article upon one platform and the weight upon the other.

With these ends in view my invention consists in the construction and combination of parts, as hereinafter fully described, and then specifically designated by the claims.

For the purpose of enabling others to understand and use my improvement, I will proceed to describe the same, referring by letters to the accompanying drawings, forming part of this specification, in which—

Figure 1 is an elevation of a complete scale, with a portion of the dial and case broken away to show the internal mechanism; and Fig. 2 is a detail view of one of the springs, showing its attachment to the slide and the adjusting device.

Similar letters denote like parts in both figures of the drawings.

A is the base, B the central standard, C the balanced arm, and D D the platforms. These are all of ordinary construction.

B' is a standard projecting upward from the standard B, and is, in fact, a continuation of the same, and may be cast integral with it, or in a separate piece and attached by rivets. The standard B' supports a case, E, and dial F.

Projecting upward from the center of the balanced arm C is an arm, C', the upper end of which rests between two branching arms, G', which constitute the lower end of a lever, G, which is pivoted in a case back of the dial. The upper end of the lever G is curved outward above the pivotal point, and to the upper end thereof is pivoted a rack-bar, H, which engages with a pinion, I, journaled at the center of the dial, which serves to actuate the pointer K upon the face of the dial. Arms G' are held in their normal position—that is to say, a position in which the pointer K is at zero on the dial—by means of springs L in the case E. These springs are so arranged that each spring will act in one direction only. One spring remains idle while the other is brought into use. I have found the following arrangement extremely simple and perfectly satisfactory: The inner end of each spring is bent to pass through a slot, m, in a rod, M. The inner end of this rod is bent to engage with a hole at the lower end of one of the arms G'. The outer end of each spring is attached by any ordinary means to a threaded rod, N, which passes through the end of the case, and is provided with a nut, N', by means of which the springs may be adjusted to insure absolute accuracy in weighing. Sufficient space is allowed between the arms G' to permit of the necessary oscillation of the arm C' in weighing without affecting the pointer, except in cases of over or under weight.

The operation is as follows: Suppose that it is intended to use my improved scale as a balance. The weight is placed upon one platform—for instance, the left—and the article to be weighed upon the other, as usual. If the article is exactly equal in weight to the weight itself, the pointer will stand at zero; but should the article weigh less than the weight, the left platform will go down and the right one up. This will oscillate the arm C' toward the left and cause it to bear against the left arm G', which will move the lever G and rack-bar H toward the right, which, acting on the pivot I, will cause the pointer K to move toward the left on the dial. The face of the dial may be graduated to indicate ounces or fractions thereof, and in the instance first referred to the pointer will indicate the exact number of ounces that the article falls short of the weight itself. Should the article weigh more than the weight, the reverse of the movements just described would take place, and the overweight would be indicated on the right side of the dial. When the arms G' move toward the left, the end of the spring on that side slides in the groove m in the rod M, and is not affected by the movement; but as the end of each spring in its normal position rests at the outer end of the slot $m$, it follows that any movement of the arms G' toward the left must be against the tension of the right spring, and vice versa.

It will of course be understood that the dial must be graduated with reference to the adjustment of the levers and the number of teeth in the pinion I. Whatever may be the adjustment, the scale begins at the top at zero and runs in both directions, the numeral at the bottom diametrically opposite to zero serving as the final numeral of both series. In practice I may have an additional series of numerals running entirely around the dial. This series will be graduated to fractions of ounces, and will be brought into requisition when it is not desired to use weights at all, or may be used in connection with weights to indicate the smaller denominations of weight.

My improved scale will be found extremely valuable both as a grocer's and an apothecary's scale, and is particularly useful in weighing articles in masses or large pieces, as when used as a balance any excess or deficiency is instantly and correctly indicated.

I claim as new and of my own invention—

1. A combined spring and balance scale having a pointer operated in connection with the balance-arm, two springs operating in opposite directions on the pointer, and two series of numerals running in opposite directions on the dial, whereby the pointer is caused to correctly indicate the difference in weight between two articles on the platforms.

2. In a spring and balance scale, an arm projecting upward from the balance-arm, in combination with a pivoted lever having two points of engagement with said arm, a rack-bar pivoted to said lever, and a pinion to which motion is imparted by the rack-bar, for the purpose set forth.

3. The balance-arm and an arm projecting therefrom, in combination with a pivoted lever having arms engaging therewith, springs which retain said arms in their normal position, and a rack-bar and pinion which impart motion to a pointer.

4. In a scale, the lever G, having arms G', in combination with rods M, having slots $m$, and springs L, as described and set forth.

5. The rods N and adjusting-nuts N', in combination with springs L, slotted rods M, and lever G G'.

6. The lever G G' and arm C', engaging loosely therewith, to allow sufficient oscillation for weighing, in combination with the pointer K and connecting mechanism, substantially as set forth.

In testimony whereof I affix my signature in presence of two witnesses.

FRANK I. HITCHCOCK.

Witnesses:
A. M. WOOSTER,
S. S. WILLIAMSON.